(12) United States Patent
Traubenberg et al.

(10) Patent No.: US 6,646,269 B1
(45) Date of Patent: Nov. 11, 2003

(54) RADIATION SOURCE MODULE AND CLEANING APPARATUS THEREFOR

(75) Inventors: George Traubenberg; Vivian Francesca Dall'Armi; Steven Mark Bakker, all of London (CA)

(73) Assignee: Trojan Technologies, Inc. (CA)

( * ) Notice: Subject to any disclaimer, the term of this patent is extended or adjusted under 35 U.S.C. 154(b) by 0 days.

(21) Appl. No.: 09/258,142

(22) Filed: Feb. 26, 1999

(51) Int. Cl.⁷ .................................................. C02F 1/32
(52) U.S. Cl. ...................................... 250/431; 250/436
(58) Field of Search .................................. 250/431, 436

(56) References Cited

U.S. PATENT DOCUMENTS 4,367,410 A * 1/1983 Wood .......................... 250/431
5,528,044 A * 6/1996 Hutchison .................... 250/431
6,013,917 A * 1/2000 Ishiyama ..................... 250/431

* cited by examiner

*Primary Examiner*—Jack Berman
(74) *Attorney, Agent, or Firm*—Katten Muchin Zavis

(57) ABSTRACT

A cleaning apparatus for a radiation source assembly in a fluid treatment system is described. The cleaning apparatus comprises: a carriage movable with respect to an exterior of the radiation source assembly; at least one cleaning sleeve in sliding engagement with the exterior of the radiation source assembly, the at least one cleaning sleeve being moveable with respect to the carriage; and drive means coupled to the carriage to translate the carriage whereby the at least one cleaning sleeve is translated over the exterior of the radiation source assembly. A radiation source module comprising the cleaning apparatus is also disclosed. The radiation source module is particularly useful for ultraviolet radiation of wastewater while having the advantages of in situ cleaning of the radiation source when it becomes fouled. Radiation source replacement is also facilitated.

67 Claims, 13 Drawing Sheets

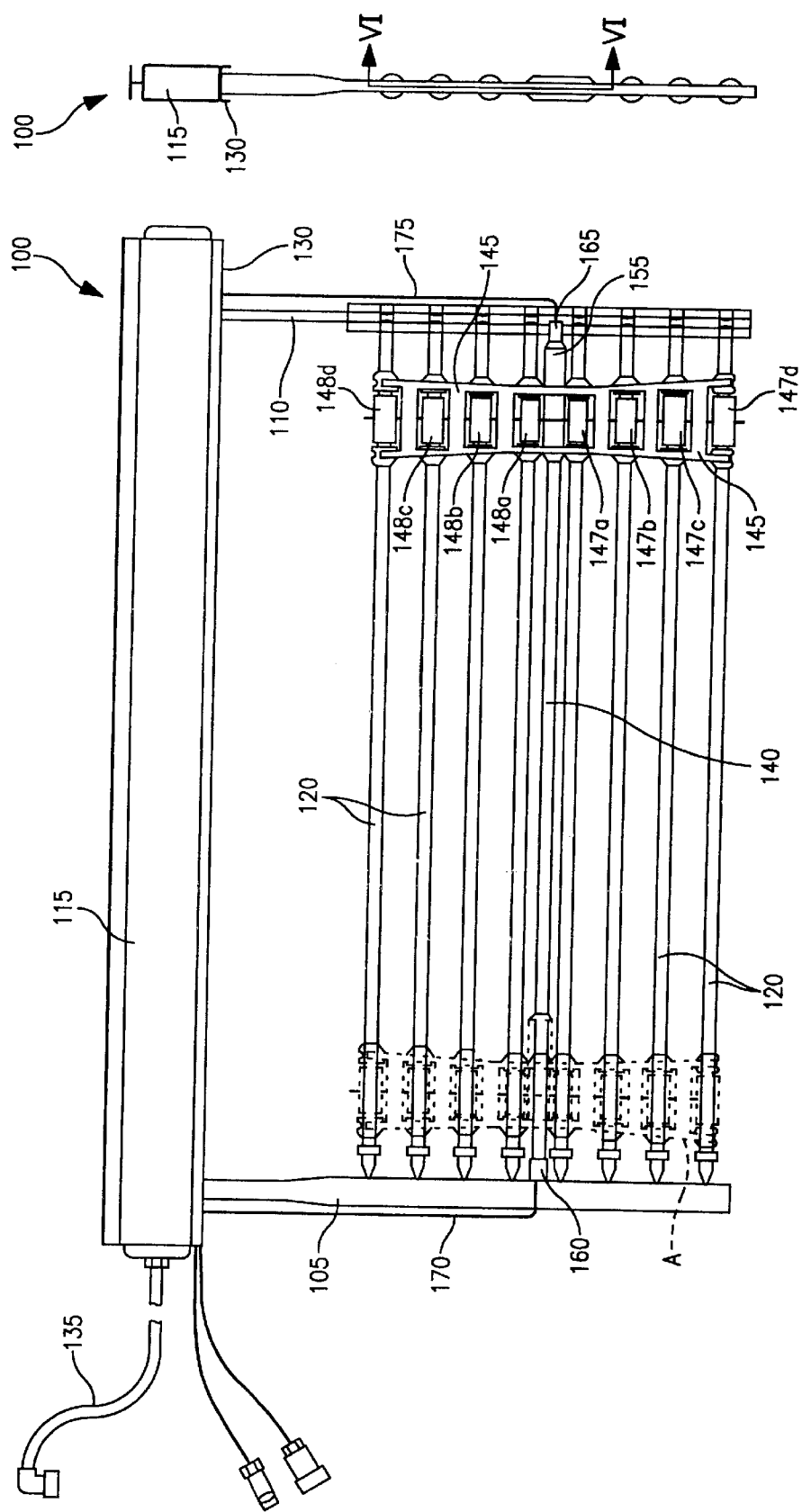

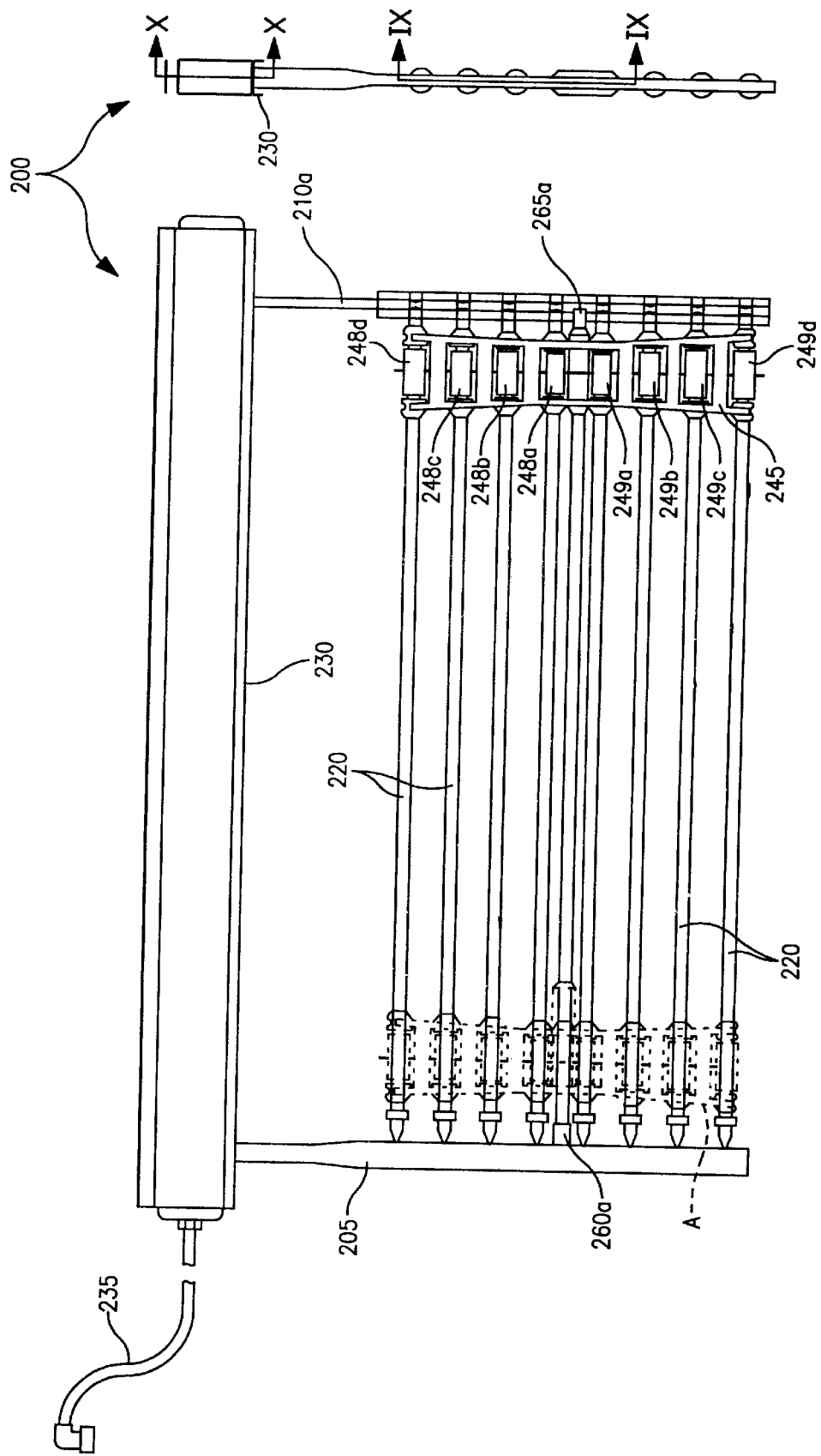

RADIATION SOURCE MODULE AND CLEANING APPARATUS THEREFOR

BACKGROUND OF THE INVENTION

1. Field of the Invention

In one of its aspects, the present invention relates to a cleaning apparatus for use in a fluid treatment module. In another of its aspects, the present invention relates to a radiation source module comprising the cleaning apparatus.

2. Description of the Prior Art

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents), the contents of each of which are hereby incorporated by reference, all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

However, disadvantages exist with the above-described systems. Depending upon the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

If the UV lamp modules are employed in an open, channel-like system (e.g., such as the one described and illustrated in Maarschalkerweerd #1 Patents), one or more of the modules may be removed while the system continues to operate, and the removed frames may be immersed in a bath of suitable cleaning solution (e.g., a mild acid) which may be air-agitated to remove fouling materials. Of course, this necessitates the provision of surplus or redundant sources of UV radiation (usually by including extra UV lamp modules) to ensure adequate irradiation of the fluid being treated while one or more of the frames has been removed for cleaning. This required surplus UV capacity adds to the capital expense of installing the treatment system. Further, a cleaning vessel for receiving the UV lamp modules must also be provided and maintained. Depending on the number of modules which must be serviced for cleaning at one time and the frequency at which they require cleaning, this can also significantly add to the expense of operating and maintaining the treatment system. Furthermore, this cleaning regimen necessitates relatively high labor costs to attend to the required remnoval/re-installation of modules and removal/re-filling of cleaning solution in the cleaning vessel. Still further, such handling of the modules results in an increased risk of damage to or breakage of the lamps in the module.

If the frames are in a closed system (e.g., such as the treatment chamber described in U.S. Pat. No. 5,504,335 (in the name of Maarschalkerweerd and assigned to the assignee of the present invention), the contents of which are hereby incorporated by reference), removal of the frames from the fluid for cleaning is usually impractical. In this case, the sleeves must be cleaned by suspending treatment of the fluid, shutting inlet and outlet valves to the treatment enclosure and filling the entire treatment enclosure with the cleaning solution and air-agitating the fluid to remove the fouling materials. Cleaning such closed systems suffers from the disadvantages that the treatment system must be stopped while cleaning proceeds and that a large quantity of cleaning solution must be employed to fill the treatment enclosure. An additional problem exists in that handling large quantities of cleaning fluid is hazardous and disposing of large quantities of used cleaning fluid is difficult and/or expensive. Of course open flow systems suffer from these two problems, albeit to a lesser degree.

Indeed, it is the belief of the present inventors that, once installed, one of the largest maintenance costs associated with prior art fluid treatment systems is often the cost of cleaning the sleeves about the radiation sources.

U.S. Pat. No. 5,418,370, 5,539,210 and 5,590,390 (all in the name of Maarschalkerweerd and all assigned to the assignee of the present invention and hereinafter referred to as the Maarschalkerweerd #2 Patents), the contents of each of which are hereby incorporated by reference, all describe an improved cleaning system, particularly advantageous for use in gravity fed fluid treatment systems which employ UV radiation. Generally, the cleaning system comprises a cleaning sleeve engaging a portion of the exterior of a radiation source assembly including a radiation source (e.g., a UV lamp). The cleaning sleeve is movable between: (i) a retracted position wherein a first portion of radiation source assembly is exposed to a flow of fluid to be treated, and (ii) an extended position wherein the first portion of the radiation source assembly is completely or partially covered by the cleaning sleeve. The cleaning sleeve includes a chamber in contact with the first portion of the radiation source assembly. The chamber is supplied with a cleaning solution suitable for removing undesired materials from the first portion of the radiation source assembly.

The cleaning system described in the Maarschalkerweerd #2 Patents represents a significant advance in the art, especially when implemented in the radiation source module and fluid treatment system illustrated in these patents. However, implementation of the illustrated cleaning system in a fluid treatment module such as the one illustrated in the Maarschalkerweerd #1 Patents is problematic.

The reason for this is that the specific system illustrated in the Maarschalkerweerd #2 Patents is based a conventional rod/cylinder design (see especially FIG. 6 and the accompanying text in the Maarschalkerweerd #2 Patents). Specifically, the cleaning rings (308) are connected to a rod (328) disposed in a cylinder (312,314). In use the rod (328) is extended from or retracted into the cylinder (312,314) thereby moving the cleaning rings (308) over the quartz sleeve surrounding the ultraviolet lamp. Thus, when the rod (328) is extended to its extreme stroke end from the cylinder (312,314), the overall length of the rod and the cylinder is approximately twice as long as the rod stroke. While this approach dovetails nicely with the radiation source module and fluid treatment system illustrated in the Maarschalkerweerd #2 Patents, it is difficult to implement the fluid treatment module illustrated in the Maarschalkerweerd #1 Patents since, in the latter Patents, the lamp is supported at both ends by an opposed pair of legs. In such a case, the distance between the opposed pair of legs would have to be doubled to allow for provision of a conventional rod/cylinder design where a single wiper is used. This becomes impractical since a preferred embodiment of the module illustrated in the Maarschalkerweerd #1 Patents involves using a low pressure, ultraviolet radiation lamp which can be up to be about five feet in length to provide the necessary wattage of radiation. This mitigates against doubling the distance between the pair of opposed legs used to support the lamps.

In U.S. patent application Ser. No. 09/185,813 [Pearcey et al. (Pearcey)], filed Nov. 3, 1998 and the contents of which are hereby incorporated by reference, there is disclosed a cleaning apparatus for a radiation source module and a radiation source module incorporated such cleaning apparatus. Generally, the cleaning apparatus and related module comprise: (i) a slidable member magnetically coupled to a cleaning sleeve, the slidable member being disposed on and slidable with respect to a rodless cylinder, and (ii) motive means to translate the slidable member along the rodless cylinder whereby the cleaning sleeve is translated over the exterior of the radiation source assembly. The teachings of Pearcey represent a significant advance in the art, particularly when implemented in a fluid treatment module such as the one illustrated in Maarschalkerweerd #1 Patents.

Notwithstanding this, there remains a need in the art for a cleaning apparatus which obviates or mitigates at least one of the above-mentioned disadvantages of the prior art. It would be desirable to have such a cleaning apparatus which is particularly well suited for implementation on a fluid treatment module such as the one illustrated in the Maarschalkerweerd #1 Patents. More specifically, it would be beneficial to have a cleaning apparatus which facilitates radiation lamp replacement and which does not place undue forces on the radiation source assemblies cleaned thereby.

SUMMARY OF THE INVENTION

It is an object of the invention to provide a cleaning system which obviates or mitigates at least one of the above-mentioned disadvantages of the prior art.

Accordingly, in one of its aspects, the present invention provides a cleaning apparatus for a radiation source assembly in a fluid treatment system, the cleaning system comprising:

a carriage movable with respect to an exterior of the radiation source assembly;

at least one cleaning sleeve in sliding engagement with the exterior of the radiation source assembly, the at least one cleaning sleeve being moveable with respect to the carriage; and drive means coupled to the carriage to translate the carriage whereby the at least one cleaning sleeve is translated over the exterior of the radiation source assembly.

In another of its aspects, the present invention provides radiation source module for use in a fluid treatment system, the module comprising:

a frame having a first support member;

at least one radiation source assembly extending from and in sealing engagement with the first support member, the at least one radiation source assembly comprising a radiation source:

cleaning means to remove undesired materials from an exterior of the at least one radiation source assembly, the cleaning means comprising:

a carriage movable with respect to an exterior of the radiation source assembly;

at least one cleaning sleeve in sliding engagement with the exterior of the radiation source assembly, the at least one cleaning sleeve being moveable with respect to the carriage; and drive means coupled to the carriage to translate the carriage whereby the at least one cleaning sleeve is translated over the exterior of the radiation source assembly.

Thus, the present inventors have developed an improved cleaning apparatus useful in a radiation source module. Generally, the present cleaning apparatus comprises a cleaning sleeve which is movable with respect to the carriage that is driven to actuate the cleaning step. In a sense, the cleaning sleeve may be regarded as a "floating" cleaning sleeve movable with respect to the carriage (this will be discussed in more detail hereinbelow). An advantage of such an arrangement is particularly noted when the cleaning apparatus is used in a radiation source module having more than one radiation source assembly (e.g., each assembly may be regarded as a combination of a radiation lamp and a protective quartz sleeve). In this arrangement of the present cleaning apparatus, since the cleaning sleeves for each radiation source assembly are moveable independent of the carriage and of one another, there is a reduction in the lateral forces to which the radiation source assemblies are subjected. This minimizes breakage of the radiation source assemblies and reduces the lateral forces created on the radiation source assemblies and the minimum applied force required to actuate the cleaning apparatus. The result of this is to reduce the overall cost of constructing the cleaning apparatus in combination with a reduction in the cost to operate the apparatus (i.e., reduced energy costs). Further, this allows for a more compact design which helps reduce hydraulic head loss in the fluid treatment system in which the radiation source module is placed.

A further advantage of the individualized cleaning sleeve approach of a preferred embodiment of the present cleaning apparatus is that it allows for easier removable and replacement of the TV lamp without the requirement to "break" the seal between the cleaning sleeve and the radiation source. In other words, multiple or individual lamp removal can be achieved without breaching, in a preferred embodiment, the cleaning solution chamber in the cleaning sleeve. This results in reduction of cleaning solution waste and improved efficiency in lamp maintenance of the radiation source module.

A particularly preferred embodiment of the present cleaning apparatus involves providing a spacing between the cleaning sleeve and the carriage which allows the cleaning sleeve to "float" within the confines of the carriage in substantially the same direction that the carriage moves with respect to the radiation source assembly. More preferably, there is a gradient of such spacing between respective radiation source assemblies in a given module. Thus, the initial frictional force required to move the carriage is reduced. This is achieved by step-wise deferral of the frictional force which must be overcome to move each cleaning sleeve. Thus, the maximum necessary actuation force is reduced since only the static force of a fraction of the cleaning sleeves in the module must be overcome at a given time. The advantage here is an overall reduction in lateral forces to which the radiation source assembly is subjected and in the overall force needed to move the carriage. Further, this preferred embodiment allows for placement of the drive means above the series of radiation source assemblies in a given module.

BRIEF DESCRIPTION OF THE DRAWINGS

Embodiments of the present invention will be described with reference to the accompanying drawings, in which:

FIG. 4 is a side elevation of a first embodiment of the present radiation source module;

FIG. 5 is an end elevation of the radiation source module illustrated in FIG. 4;

FIG. 7 is a side elevation of a second embodiment of the present radiation source module;

FIG. 8 is an end elevation of the radiation source module illustrated in FIG. 7;

DETAILED DESCRIPTION OF THE PREFERRED EMBODIMENTS

Figure 1:
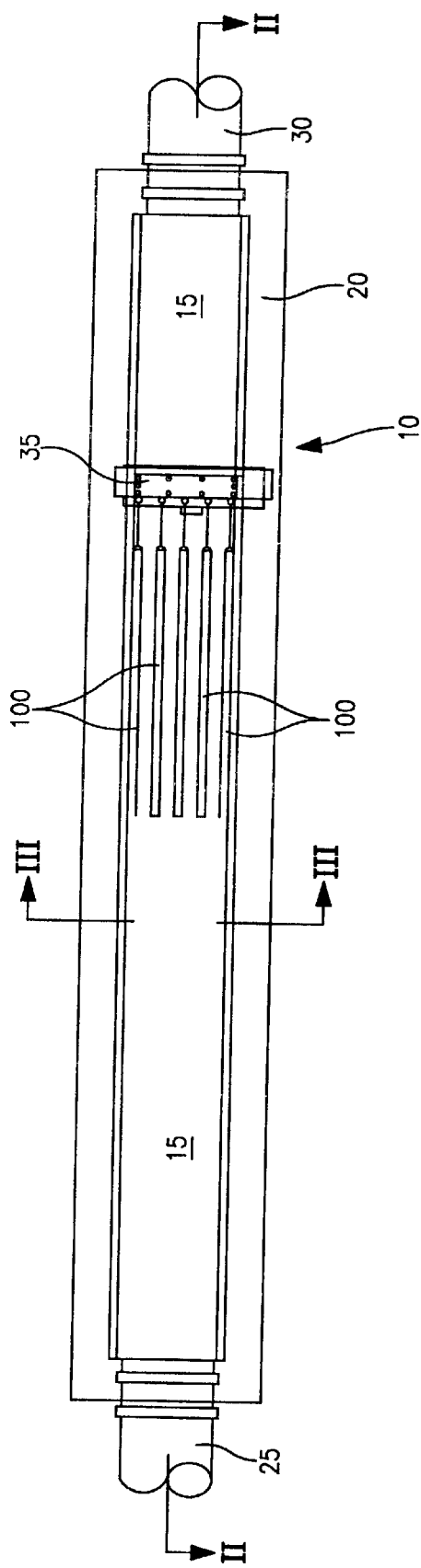
FIG. 1 is a top view of fluid treatment system incorporating the present radiation source module.
Figure 2:
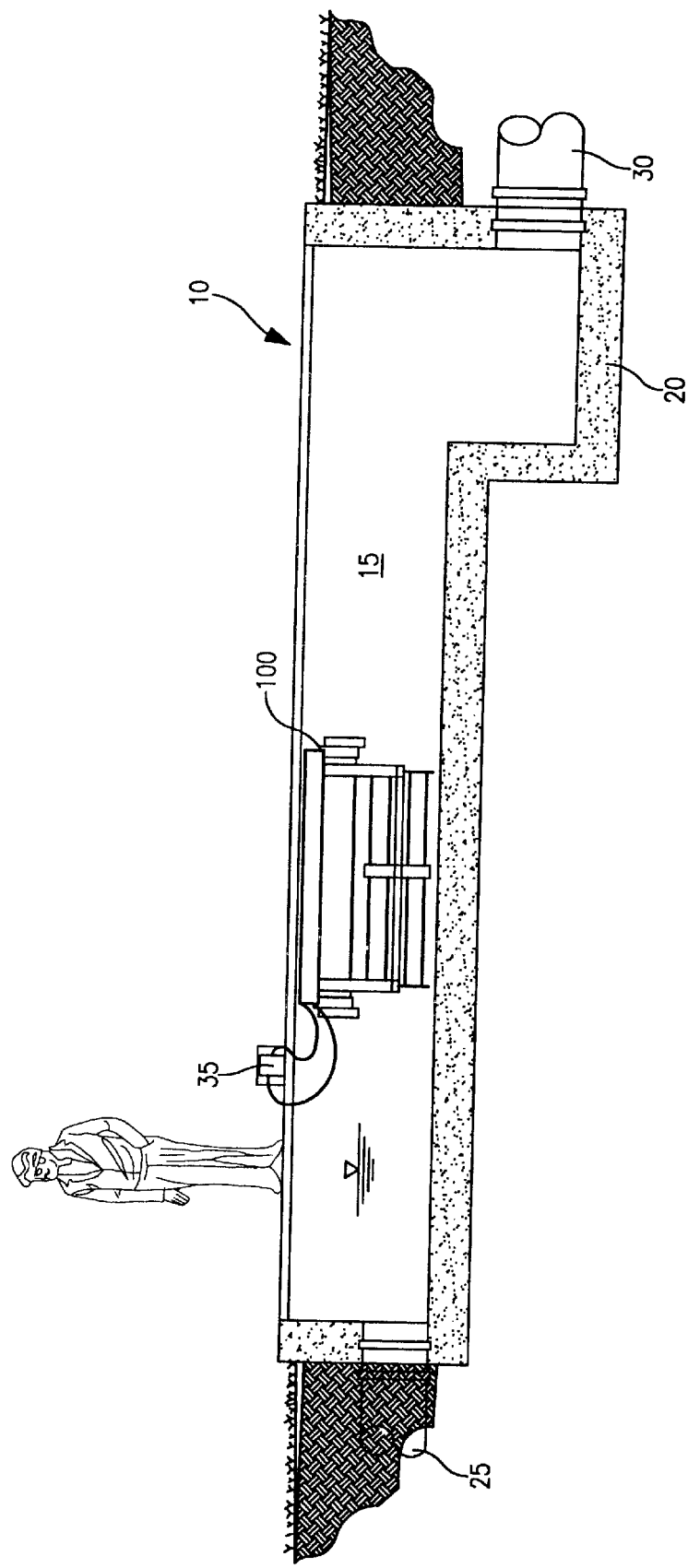
FIG. 2 is a sectional view taken along line II—II in FIG. 1.
Figure 3:
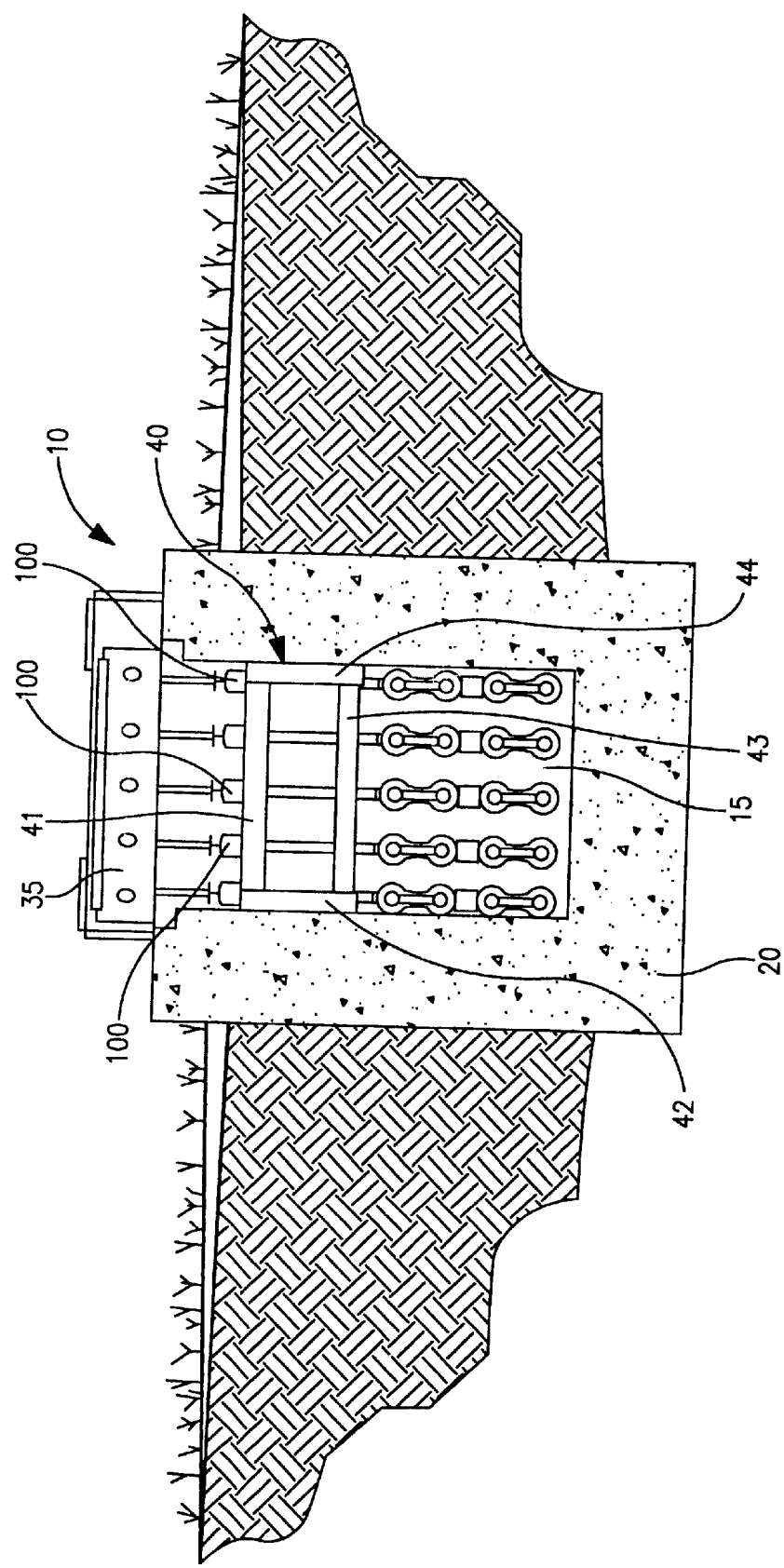
FIG. 3 is a sectional view taken along line III—III in FIG. 1.

With reference to FIGS. 1–3, there is illustrated a fluid treatment system 10. Fluid treatment system 10 comprises a channel 15 constructed of concrete 20. Channel 15 has an inlet 25 and an outlet 30 for receiving a flow of fluid (not shown).

Disposed in channel 15 is a plurality of radiation source modules 100. Each radiation source module 100 is connected to an electrical power supply 35 by an electrical lead 135.

As will be appreciated by those with skill in the art, fluid treatment system 10 illustrated in FIGS. 1–3 is a schematic only and has been greatly simplified to illustrate the arrangement of radiation source modules 100. As illustrated, it is preferred that radiation source modules 100 be arranged such that the elongated portions thereof are substantially parallel to the flow of fluid.

With particular reference to FIG. 3, a cradle 40 comprised of supports 41,42,43,44 is disposed in channel 15. As illustrated, support members 41,43 of cradle 40 are arranged transverse to the fluid flow in channel 15. Further, support members 42,44 are affixed to the sides of channel 15. Those with skill in the art will recognize that, in the illustrated embodiments fluid treatment system 10 is designed such that the flow of fluid does not rise significantly above support member 43 of cradle 40.

The operation of fluid treatment system 10 is conventional and within the purview of a person skilled in the art. See, for example, the Maarschalkerweerd #1 Patents discussed herein above, the contents of which have been incorporated by reference herein above.

Figure 6:
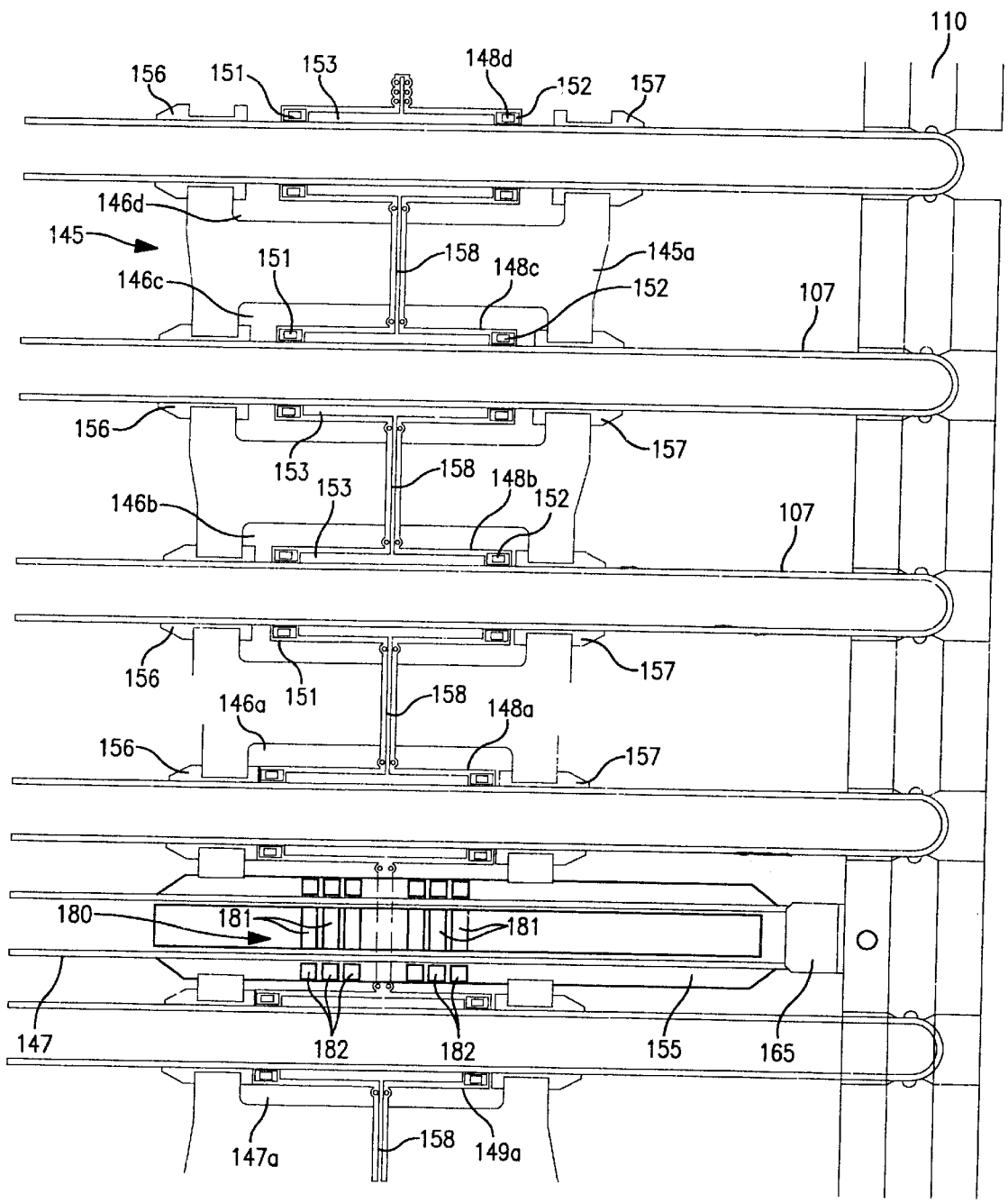
FIG. 6 is an enlarged sectional view taken along line VI—VI in FIG. 5.
Figure 9:
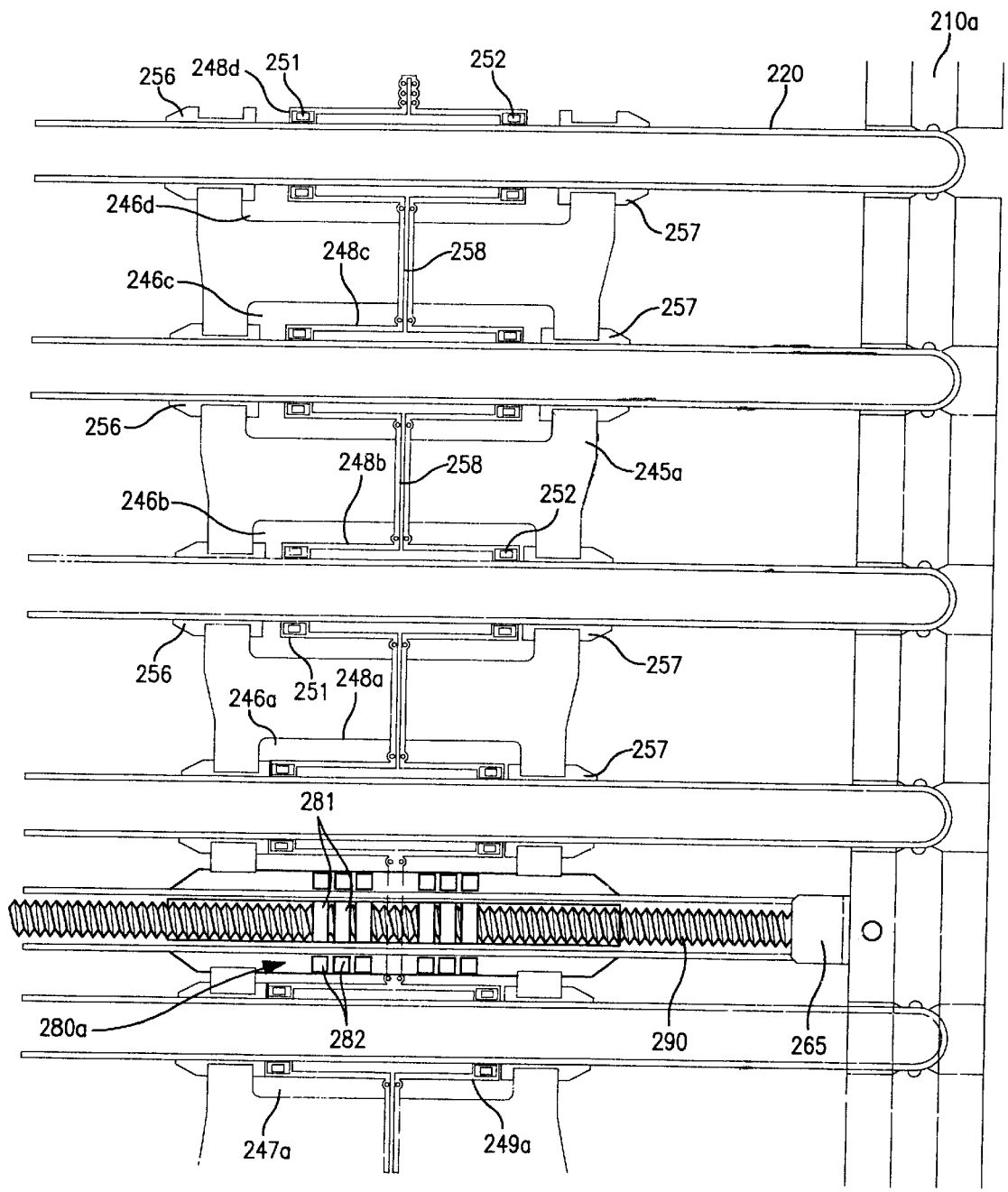
FIG. 9 is an enlarged sectional view taken along line IX—IX in FIG. 8.
Figure 10:
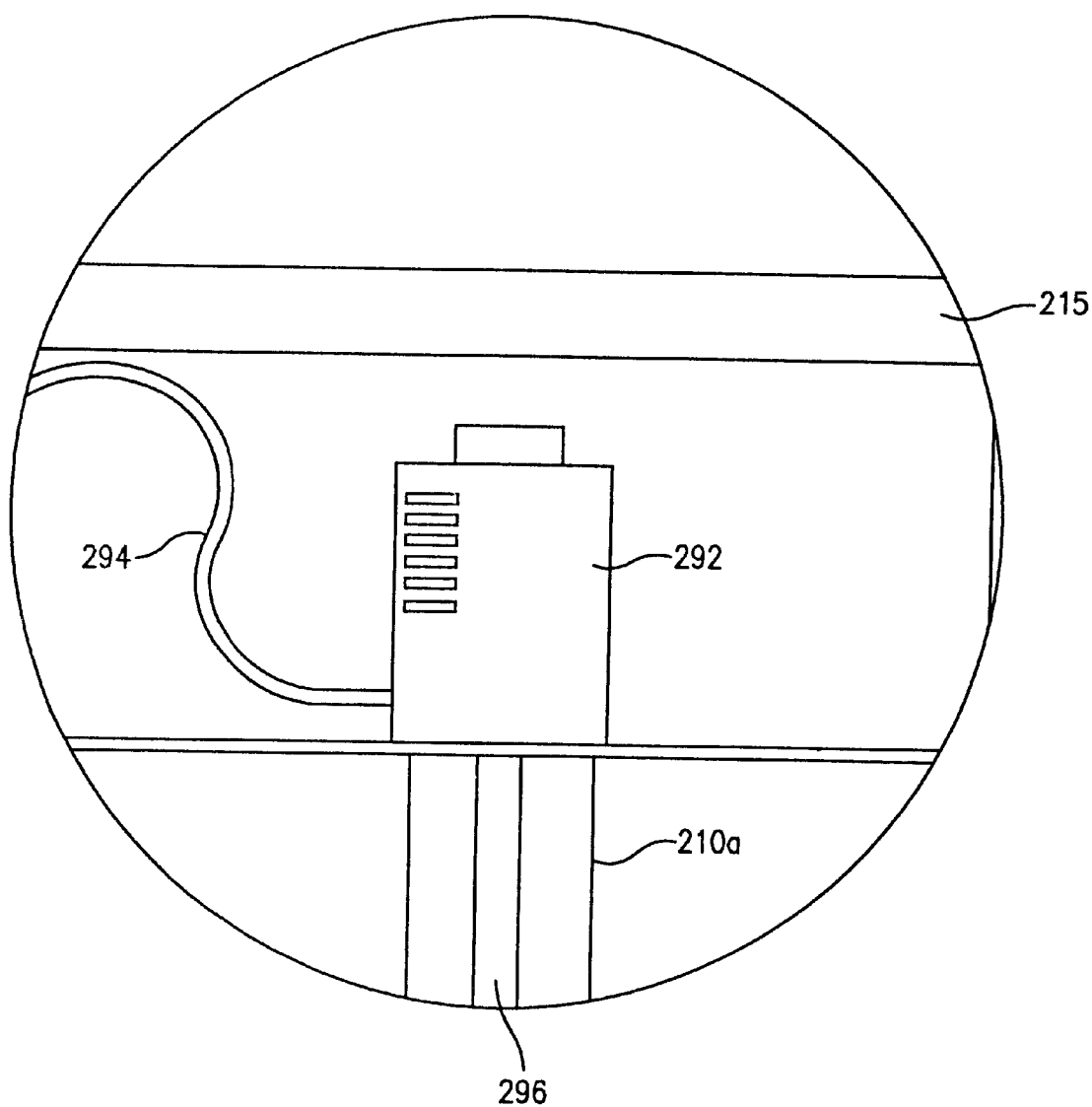
FIG. 10 is an enlarged sectional view taken along line X—X in FIG. 8.

With reference to FIGS. 4–6, radiation source module 100 will now be described in more detail. Thus, radiation source module 100 comprises a pair of support legs 105,110 depending from a cross piece 115. Disposed between support legs 105,110 are a series of radiation source assemblies 120. Preferably, the exterior of each radiation source assembly 120 comprises a protective sleeve 107, more preferably made of quartz. The design of support legs 105,110 and radiation source assemblies 120 is preferably as is described in U.S. Pat. Nos. 4,872,980 and 5,006,244 referred to and incorporated by reference herein above. More preferably, it is preferred to design support leg 105 and/or support leg 110 to include a stop or similar means to avoid movement of the radiation source assemblies 120 during actuation of the present cleaning system.

Figure 11:
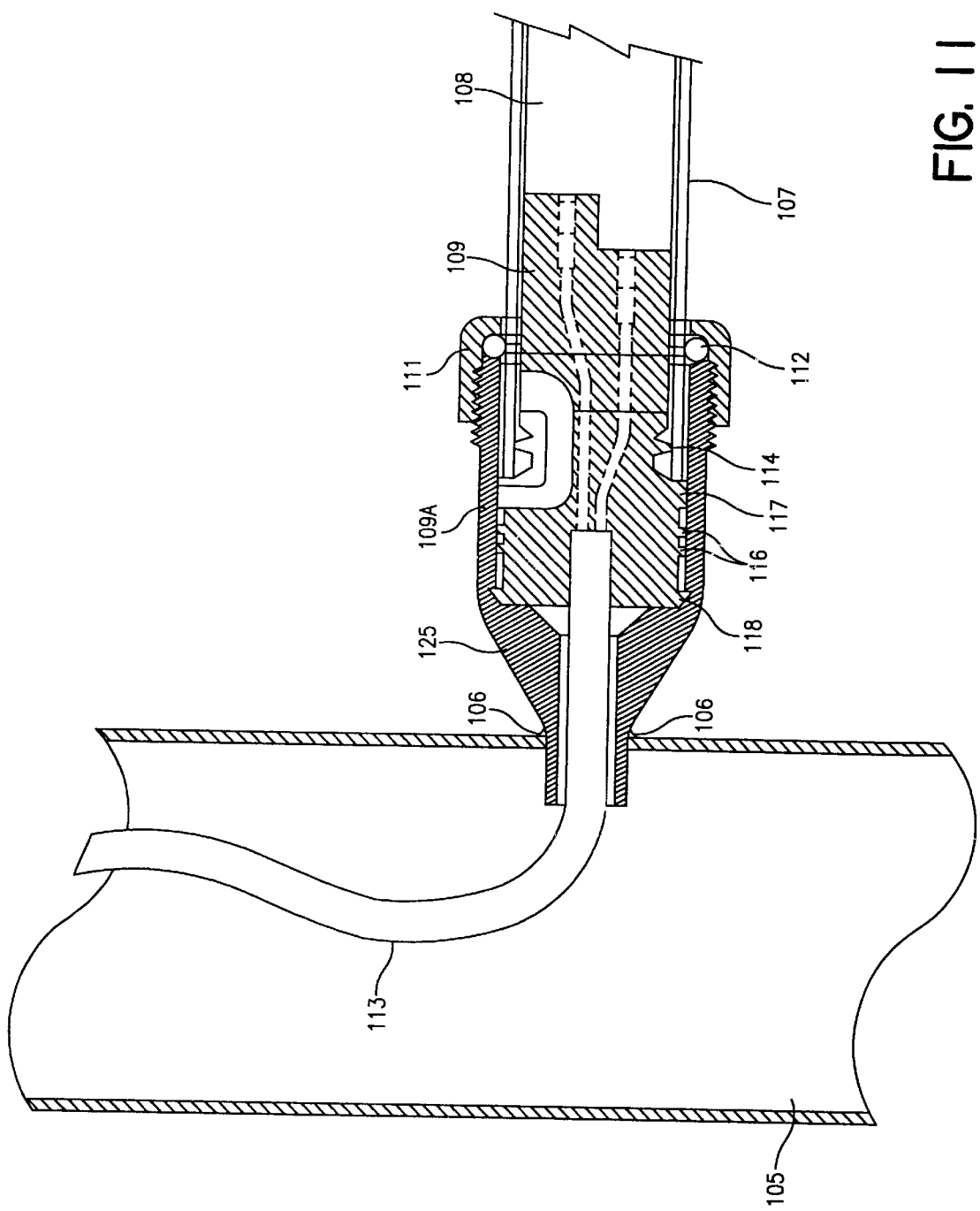
FIG. 11 is an enlarged sectional view of connection of the radiation source assembly to the support leg in a preferred embodiment of the present radiation source module.
Figure 12:
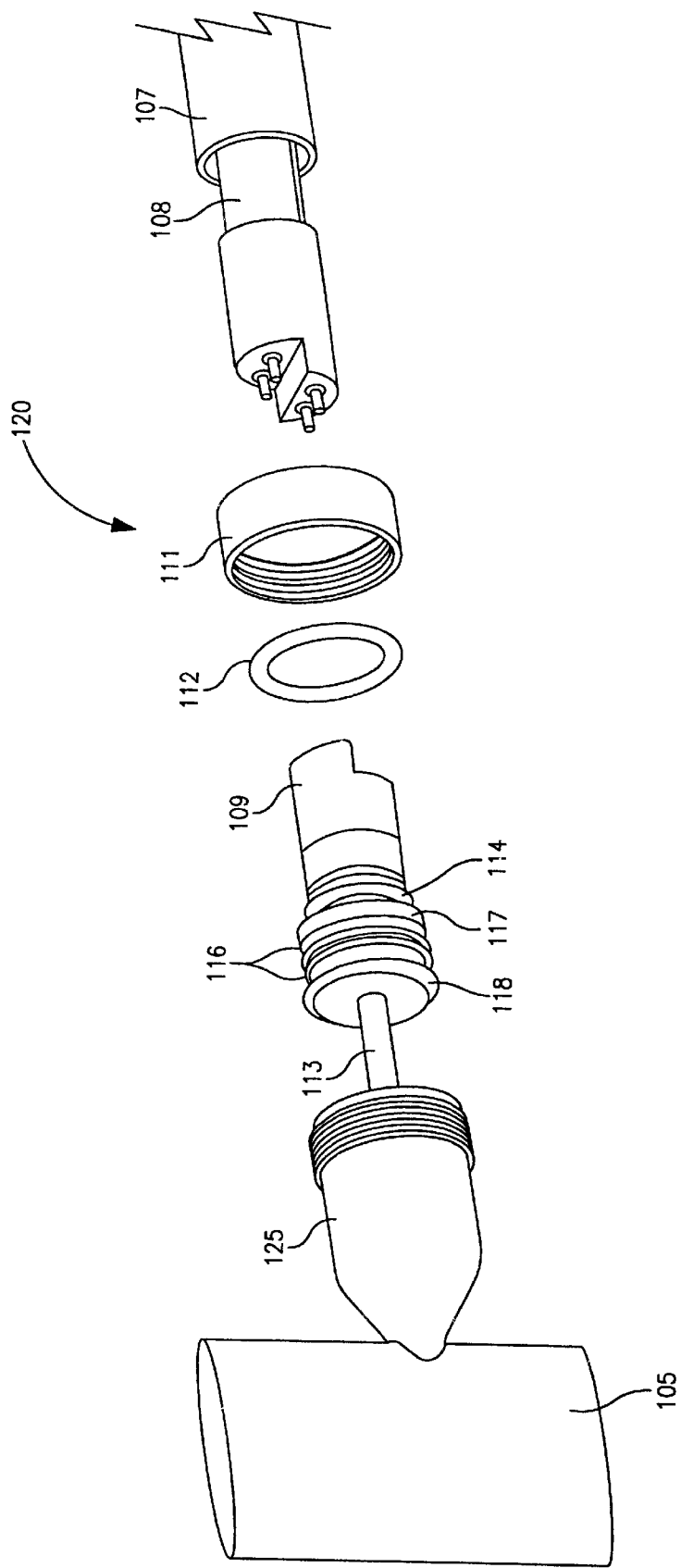
FIG. 12 is a perspective view of various unassembled elements illustrated in FIG. 11.

With reference to FIGS. 11 and 12, further detail is provided on radiation source assembly 120, coupling socket 125 and support leg 105. Thus, coupling socket 125 is welded to support leg 105 via a bead 106. Coupling socket 125 receives quartz sleeve 107 having disposed therein a radiation (preferably ultraviolet radiation) lamp 108. Coupling socket 125 also receives a connection member 109. A sleeve nut 111 is in threaded engagement with coupling socket 125 which serves to squeeze an O-ring 112 against quartz sleeve 107.

As shown, connection member 109 serves a number of purposes. First, it serves the purpose of connecting radiation lamp 108 to an electrical lead 113 which is fed to the ballast (not shown) incorporated in cross piece 115 or located remotely from radiation source module 100. Second, connection member 109 is provided with a first sealing lip 114 and a pair of second sealing lips 116. First sealing lip 114 serves two purposes: (i) to prevent water from entering the space between quartz sleeve 107 and radiation lamp 108 from support leg 105, and (ii) it is first seal to water entering support leg 105 (e.g., in the event that quartz sleeve 107 breaks) upon breakage of quartz sleeve 107. Lips 116 prevent water which may have leaked into support leg 105 from entering into radiation source assembly 120. Third, connection member 109 contains a stop 117 against which the open end of quartz sleeve 107 abuts thereby avoiding quartz sleeve 107 being damaged on contact with metal coupling socket 125. Fourth, connection member 109 contains a lip 118 of slightly larger diameter than the internal diameter of coupling socket 125 disposed in support leg 105. Lip 118 serves to affix connection member 109 in the correct position.

In a preferred embodiment of the connection scheme illustrated in FIGS. 11 and 12, a surface grounding lead 109A is provided (as a part of connection member 109) with one end connected to the inside of coupling socket 125 and the other end on the lamp side of first sealing lip 114 (e.g., in the lamp pin receptacle of connection member 109, in the space between connection member 109 and quartz sleeve 107, etc.). As will be appreciated by those of skill in the such an arrangement will allow for ground fault detection and automatic shutdown of the module (e.g., via a conventional Ground Fault Interrupt switch) in the event of breakage of quartz sleeve 107. The ground fault is used to detect water leakage.

Alternatively, the coupling of radiation source assemblies 120 to support leg 105 may be as described in U.S. Pat. Nos. 4,872,980 and 5,006,244. This includes a "triple seal system" which serves to seal radiation source module 100 from fluid ingress: (i) at the connection between radiation source assembly 120 and coupling socket 125, (ii) into radiation source assembly 120, and (iii) into support leg 105. The latter two functions are particularly preferred since they will protect flooding of all radiation source assemblies 120 in module 100 in the event that a single radiation source assembly 120 is broken while submerged.

Another preferred feature of radiation source assembly 100 is the provision, preferably in cross piece 115 of a ballast (not shown) to control the radiation source in radiation source assemblies 120. Again, reference is made to previously mentioned and incorporated U.S. Pat. Nos. 4,872,980 and 5,006,244 for a more detailed description of provision of a ballast in radiation source module 100.

Also disposed between support legs 105,110 is a U-shaped member 130. As will be appreciated by those with skill in the art, when a series of radiation source modules 100 are aligned in a side-by-side arrangement, the corresponding side-by-side arrangement of U-shaped members 130 in each module 100 serves to provide at least a coarse shield from escape of radiation while the radiation source modules 100 are in use. With further reference to FIG. 4, an electrical lead 135 emanates from cross-piece 115. Preferably, electrical lead 135 is connected to a ballast (not shown) in cross piece 115. Also connected to this ballast is electrical lead 113 which is fed through a hollow passage in support leg 105 as described in U.S. Pat. Nos. 4,872,980 and 5,006,244, mentioned above and incorporated by reference. If ballast is not incorporated in the module, electrical lead 113 is combined with other electrical leads from other radiation source assemblies 120 in a given module to form electrical lead 135 which is then connect to a ballast and supply of electricity remote to the module.

With further reference to FIG. 4, a rodless cylinder 140 is disposed between support legs 105,110. Disposed on rodless cylinder 140 is a carriage 145. Carriage 145 comprises a series of cleaning sleeves 148a,148b,148c,148d and 149a, 149b,149c,149d which will be described in more detailed herein below. Carriage 145 is connected to a slidable member 155 which is in sliding engagement with rodless cylinder 140.

Rodless cylinder 140 is connected to a pair of connection blocks 160,165 disposed on support legs 105,110, reactively. A first fluid pressurization line 170 is connected to connection block 160 and a second fluid pressurization line 175 is connected to connection block 165. Fluid pressurization lines 170,175 are connected to a source of pressurized fluid (not shown). This may be a source of hydraulic pressure or pneumatic pressure. The connections to and from connection blocks 160,165 are preferably made substantially fluid-tight in a conventional manner which is within the purview of a person of ordinary skill in the art.

With particular reference to FIG. 6, a preferred form of the present cleaning apparatus is illustrated. As illustrated, carriage 145 comprises a pair of split plates 145a,145b (for clarity, corresponding split plate 145b is not depicted in FIG. 6). Split plate 145a of carriage 145 comprises a series of openings 146a,146b,146c,146d on one side of rodless cylinder 140. On the other side of rodless cylinder 140, split plate 145a of carriage 145 comprises another series of openings 147a,147b,147c,147d (see also FIG. 4). Disposed in openings 146a,146b,146c,146d is a cleaning sleeve 148a, 148b,148c,148d, respectively. Disposed in opening 147a is cleaning sleeve 149a. As will be appreciated by those of skill in the art, further cleaning sleeves 149 are disposed in further openings 147 (for clarity, these are not specifically illustrated in FIG. 6). Each cleaning sleeve 148/149 comprises a pair of seals 151,152, preferably in the form of O-rings, to define a chamber 153. As shown, a pair of drive cones 156,157 serve to provide an interface between split plate 145a of carriage 145 and quartz sleeve 107. Preferably, drive cones 156,157 are made of Teflon™.

As illustrated, cleaning sleeves 148/149 are interconnected by a hose 158. As will be appreciated by those of skill in the art, this allows for use of a single supply of cleaning solution to fill chamber 153 in each cleaning sleeve 148/149. Of course, those of skill in the art will recognize that it is possible to omit this interconnection approach and maintain independence between chamber 153 of each cleaning sleeve 148/149.

As shown, there is virtually no spacing between cleaning sleeve 148a and drive cones 156/157. A slight gap is provided between cleaning sleeve 148b and drive cones 156,157. An even larger gap is provided between cleaning sleeve 148c and drive cones 156,157. A yet larger gap is provided between cleaning sleeve 148d and drive cones 156,157. As will be apparent to those of skill in the art, the increasing gap size was achieved by increasing the longitudinal dimension of openings 146a to 146d. This is preferred since it allows manufacture and use of a universally dimensioned cleaning sleeve 148. Of course, it is possible to modify the dimension of the cleaning sleeve in addition to or in place of modifying the dimension of the opening in split plate 145a of carriage 145.

Preferably, chamber 153 of cleaning sleeves 148/149 are filled with a cleaning solution (not shown), if desired. The nature of this cleaning solution is not particularly restricted provided care is taken that it is not so corrosive that components of the cleaning sleeve become damaged by contact with the cleaning solution.

With further reference to FIG. 6, disposed within rodless cylinder 140 is a piston 180. Piston 180 comprises a series of permanent magnets 181. Permanent magnets 181 are in fluid sealing engagement with the interior of rodless cylinder 140. Disposed within slidable member 155 is a series of annular permanent magnets 182 which are aligned with permanent magnets 181. Preferably, opposed pairs of individual permanent magnets 181 and individual annular permanent magnets 182 have different poles thereby creating an attraction between slidable member 155 and piston 180. A magnetically coupled rodless cylinder such as the one illustrated herein is described in more detail in U.S. Pat. No. 3,779,401 [Carrol], U.S. Pat. No. 4,488,477 [Miyamoto] and U.S. Pat. No. 4,744,287 [Miyamoto], the contents of which are hereby incorporated by reference.

Preferably, slidable member 155 is in a fluid sealing engagement with rodless cylinder 140. This can be achieved in any suitable manner way. For example, a pair of annular seals (not shown) may be provided between slidable member 155 and rodless cylinder 140. The seal may be achieved by using an interference fit between slidable member 155 and rodless cylinder 140, the magnetic forces created by the coupling of slidable member 155 to piston 180 or a combination of these. The advantage of providing such a seal between slidable member 155 and rodless cylinder 140 is that the exposed surface of rodless cylinder 140 is wiped during operation thereby keeping it relatively clean to avoid jamming of the cleaning system.

Radiation source module 100 is used to treat wastewater in the manner described in the Maarschalkerweerd #1 Patents referred to herein above. After some period of use, the exterior of radiation source assemblies will become fouled with undesired materials such as organic matter (e.g, biofilm) and/or inorganic mater (e.g., scale). This can be readily determined from historical data gathered during operation of fluid treatment system 10. Once it is desired to remove the undesired materials from the exterior of radiation source assemblies 120, a pressurized fluid is admitted through line 175 into rodless cylinder 140 via connection block 165. This serves to urge and translate slidable member 155 along rodless cylinder 140 (which in turn is coupled to carriage 145) toward support leg 105 until carriage 145 is positioned adjacent connection block 160 as shown at A in FIG. 4. Thereafter, pressurized fluid is fed through fluid pressurization line 170 and connection block 160 to urge and translate slidable member 155 toward support leg 110 (in the illustrated embodiment, this is the "parked position" of slidable member 155). Thus, those with skill in the art will immediately recognize that slidable member 155 and carriage 145 connected thereto operate to remove undesired materials from the exterior of radiation source assemblies 120 in a reciprocal manner. One of the key advantages of radiation source module 100 is that, once historical data on frequency of cleaning needed has been gathered, the cleaning operation can be substantially automated allowing for in situ cleaning of the exterior of radiation sources assemblies 120 without the need to remove modules and/or shut down fluid treatment system 10.

With reference to FIG. 6, once slidable member 155 is urged and translated along rodless cylinder 140, carriage 145 is translated thereby abutting and translating each cleaning sleeves 148/149. By providing a gradient of spacing between adjacent cleaning sleeves 146 and adjacent cleaning sleeves 147 as described herein above, carriage 145 meets with significantly less frictional resistance to initial movement when compared to a scenario wherein all the cleaning sleeves are abutted by carriage 145 at the same time. This is a particular advantage of the specifically illustrated embodiment. An additional benefit of rodless cylinder 140 is that it can obviate the need for a supplementary support between support legs 105,110—e.g., the one illustrated (11) in U.S. Pat. No. 4,482,809 referred herein above.

With reference to FIGS. 7–10, another embodiment of the present radiation source module is illustrated. For clarity, elements in FIGS. 7–10 which correspond to like elements in FIGS. 4–6 have the same last two digits with a different first digit. Thus, for example, whereas radiation source module 100 is illustrated in FIGS. 4–6, radiation source 200 is illustrated in FIGS. 7–10.

The principal difference between radiation source module 100 illustrated in FIGS. 4–6 and radiation source module 200 illustrated in FIGS. 7–10 is that, in the latter, piston 280a is engaged with a screw member 290. Screw member 290 is driven by a motor 292 (preferably a DC motor) disposed in cross-piece 215. An electrical lead 294 emanates from motor 292 and is connected to a source of electricity (not shown). Motor 292 drives a shaft 296 which is disposed in support leg 210a. Shaft 296 is engaged with screw member 290 by a conventional bevel gear (not shown) disposed in connection block 265a. Those of skill in the art will recognize that motor 292 is reversible so that rotation of screw member 290 may be reversed.

Radiation source module 200 illustrated in FIGS. 7–10 may be used in a manner similar to that discussed herein above for radiation source module 100 illustrated in FIGS. 4–6. Thus, once it is desired to remove the undesired materials from the exterior of radiation source assemblies 220, motor 292 is actuated thereby rotating screw member 290. This serves to urge and translate slidable member 255 along rodless cylinder 240 (which in turn is coupled to cleaning sleeve 245) toward support leg 205. Once slidable member 255 is adjacent to support leg 205, the drive of electric motor 292 is reversed thereby reversing rotation of screw member 290, and urging and translating slidable member 155 toward support leg 210a.

Figure 13:
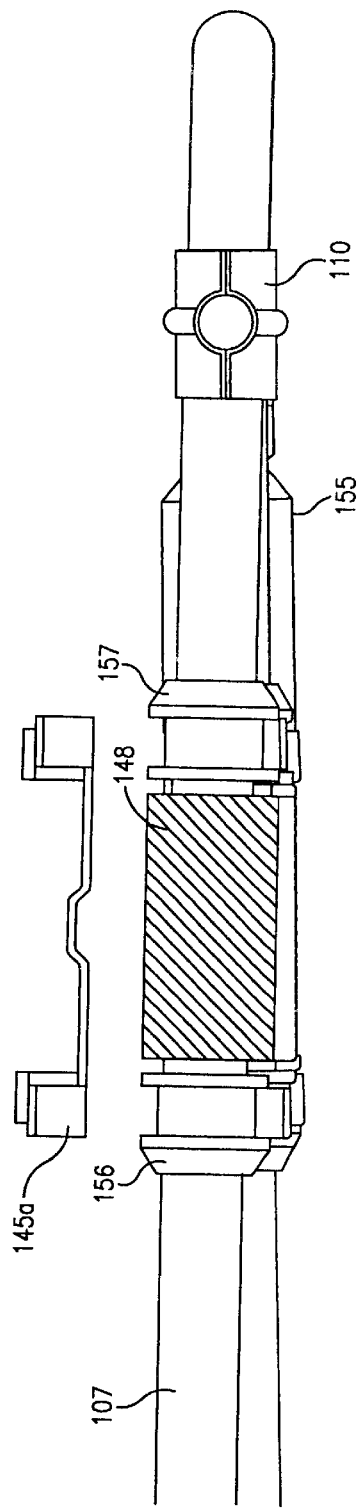
FIGS. 13–16 illustrated a simplified top view of removal of a radiation lamp from a radiation source assembly.
Figure 14:
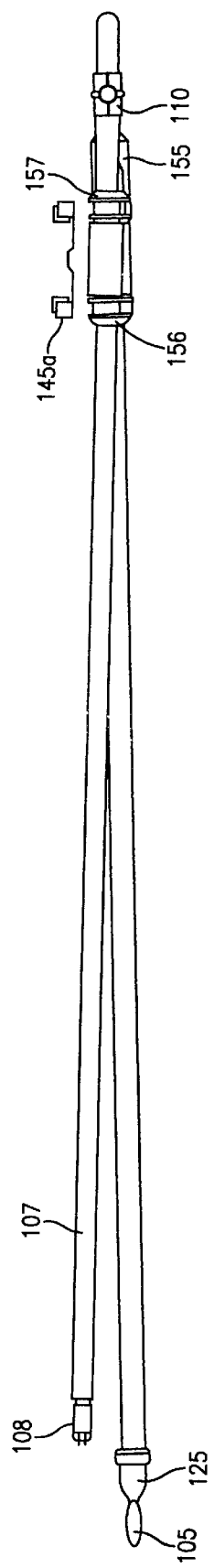
Figure 15:
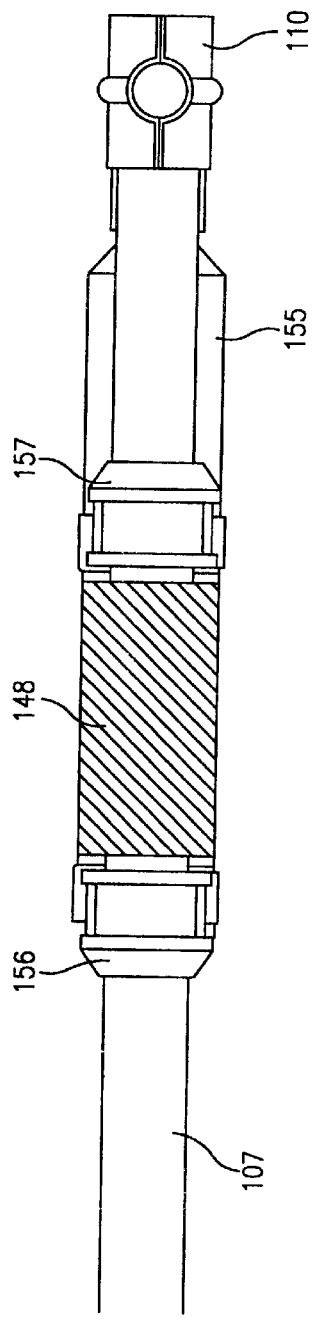
Figure 16:
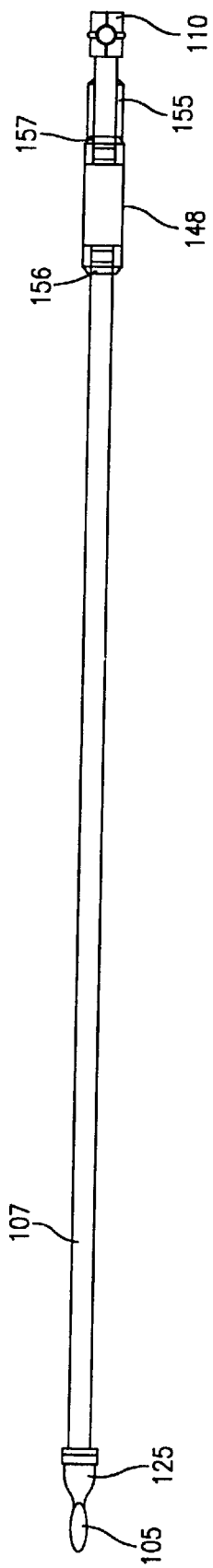

With reference FIGS. 13–16, a particular advantage of the present cleaning apparatus is illustrated. Thus, when a lamp in the radiation source module needs to be replaced, sleeve nut 111 is disengaged from coupling socket 125 and split plate 145a is disengaged from carriage 145. With carriage 145 in the parked position (as described above), quartz sleeve 107 may be moved laterally to permit withdrawal of radiation lamp 108. The advantage is that this can be done to replace a single lamp without the need to disengage the quartz sleeves for the remaining lamps in module 100. Another key advantage is replacement of radiation lamp 108 may be accomplished without the need to "break" the seal between cleaning sleeve 148/149 and the respective quartz sleeve. This greatly simplifies maintenance of module 100 in the field and reduces the associated costs thereof. Thus, FIGS. 13 and 14 illustrate lateral displacement of quartz sleeve 107 to permit removal of radiation lamp 108 and FIGS. 15 and 16 illustrate the unit before/after lamp replacement.

Figure 17:
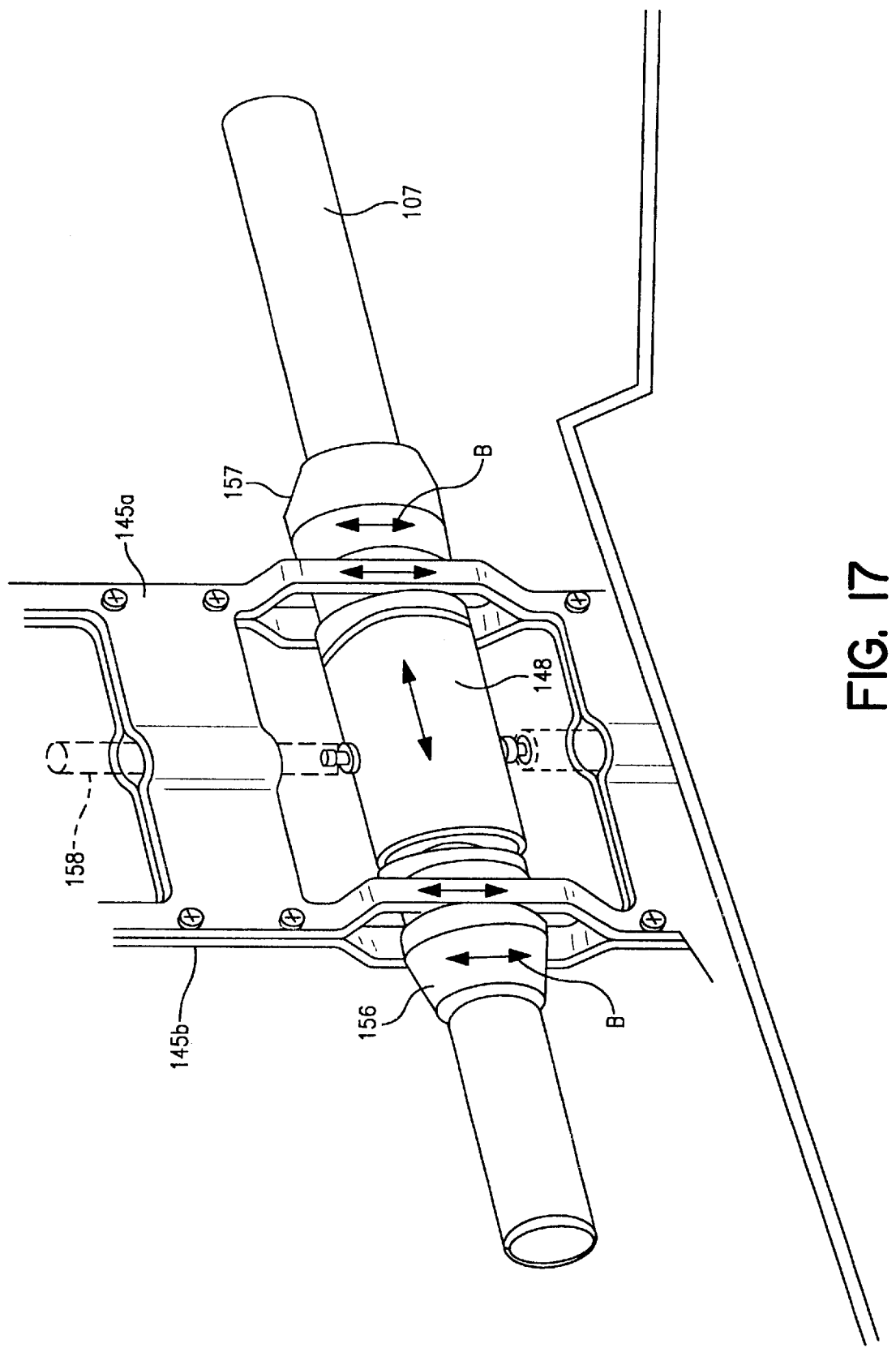
FIG. 17 illustrates an embodiment of the carriage of the present cleaning apparatus which allows for two independent degrees of movement between the clean sleeves and the carriage.

While the present invention has been described with reference to preferred and specifically illustrated embodiments, it will of course be understood by those of skill in the arts that various modifications to these preferred and illustrated embodiments may be made without the parting from the spirit and scope of the invention. For example, it is possible to modify the design of split plates 145a/145b of carriage 145 as shown in FIG. 17 to enhance the ability of the radiation source assembly and the cleaning sleeve to move in the direction of arrows B (i.e., in addition to the degree of longitudinal movement illustrated). Further, while the illustrated embodiments of the present cleaning system related to a cleaning sleeve which is sealed to provide a cleaning chamber, the invention is intended to cover other cleaning sleeves such as those without a sealed chamber (e.g., an O-ring wiper arrangement) and those which comprise mechanical brushes. Further, the particular manner of urging and translating the drive member within the rodless cylinder is not restricted. In this regard, the drive member could be urged and translated using a series of cables and pulleys connected to a drive block typically (but not necessarily) located above the water level (e.g., a cable could be connected to each end of the piston in the rodless cylinder and fed out of opposed ends of the rodless cylinder and routed to the drive block via a suitable arrangement of pulleys). Further, it is not necessary to have a pair of opposed, laterally spaced support legs. Specifically, it is possible to modify the specific illustrated embodiment of the present radiation source module to a "single legged" module such as the one described in the Maarschalkerweerd #2 Patents. Still further, it is possible to have a plurality of cleaning sleeves per module. Still further, it is possible to modify the specifically illustrated embodiment such that the cleaning sleeve comprises of single wiper in place of an annular chamber surrounding the exterior of the radiation source assembly and containing a cleaning fluid. Still further, it is possible to modify the illustrated radiation source module to include two parking locations for the cleaning sleeve located adjacent the respective support legs (i.e., in this case a single stroke of the rodless cylinder would be a cleaning cycle whereas, in the illustrated embodiment, a double stroke of the rodless cylinder would be a cleaning cycle). Still further, if the rodless cylinder is operated by fluid pressurization, it possible to modify the illustrated embodiment to include the fluid pressurization lines in the respective support legs of the module thereby obviating additional hydraulic head loss. Alternatively, the illustrated embodiment could be modified to include a hydraulically streamline shield disposed upstream of the upstream support leg of the module. Still further, it is possible to modify the illustrated embodiment to utilize a rodless cylinder having a single port connected to a fluid pressurization source. In this modification, the single port would act as both a fluid inlet and a fluid outlet. For example, in one stroke of the rodless cylinder, the single port could be used to admit pressurized fluid and, in the reverse stroke, the single port could be used to draw a vacuum or as an exhaust (e.g., by the use of a spring or other biasing member located inside the rodless cylinder at the end opposite to the single inlet). Other modifications will be readily apparent to those with skill in the art.

What is claimed is:

1. A cleaning apparatus for a radiation source assembly in a fluid treatment system, the cleaning system comprising:
   a carriage movable with respect to an exterior of the radiation source assembly;
   at least one cleaning sleeve in sliding engagement with the exterior of the radiation source assembly, the at least one cleaning sleeve being moveable with respect to the carriage; and
   drive means coupled to the carriage to translate the carriage whereby the at least one cleaning sleeve is translated over the exterior of the radiation source assembly.

2. The cleaning apparatus defined in claim 1, wherein the at least one cleaning sleeve is rotationally moveable with respect to the carriage.

3. The cleaning apparatus defined in claim 1, wherein the at least one cleaning sleeve is moveable with respect to the carriage in substantially the same direction as the carriage is moveable with respect to the exterior of the radiation source assembly.

4. The cleaning apparatus defined in claim 1, wherein a spacing is provided between the at least one cleaning sleeve and the carriage.

5. The cleaning apparatus defined in claim 1, wherein the at least one cleaning sleeve is moveable with respect to the carriage in a direction substantially orthogonal to the direction in which the carriage is moveable with respect to the exterior of the radiation source assembly.

6. The cleaning apparatus defined in claim 1, wherein the carriage is mechanically coupled to the drive means.

7. The cleaning apparatus defined in claim 6, wherein the drive means comprises a screw drive.

8. The cleaning apparatus defined in claim 1, wherein the carriage is magnetically coupled to the drive means.

9. The cleaning apparatus defined in claim 8, wherein the drive means comprises a rodless cylinder.

10. The cleaning apparatus defined in claim 9, wherein the rodless cylinder comprises a driving member disposed in a housing, the driving member being axially slidable within the housing.

11. The cleaning apparatus defined in claim 8, wherein the drive means is operable by a fluid pressurization source.

12. The cleaning apparatus defined in claim 8, wherein the drive means is operable by a fluid vacuum source.

13. The cleaning apparatus defined in claim 11, wherein the fluid pressurization source is connected to a first port which is in communication with the rodless cylinder, the first port acting alternately as a fluid inlet and fluid outlet.

14. The cleaning apparatus defined in claim 11, wherein the fluid pressurization source is connected to a first port and a second port which are in communication with the rodless cylinder.

15. The cleaning apparatus defined in claim 11, wherein the fluid pressurization source comprises a source of hydraulic pressure.

16. The cleaning apparatus defined in claim 11, wherein the fluid pressurization source comprises a source of pneumatic pressure.

17. The cleaning apparatus defined in claim 8, wherein the rodless cylinder is submersible in a fluid to be treated.

18. The cleaning apparatus defined in claim 1, comprising a plurality of cleaning sleeves.

19. The cleaning apparatus defined in claim 1, comprising at least one pair of cleaning sleeves opposed with respect to the drive means.

20. The cleaning apparatus defined in claim 19, wherein a spacing is provided between at least one of the cleaning sleeves and the carriage.

21. The cleaning apparatus defined in claim 1, comprising a first plurality of cleaning sleeves and a second plurality of cleaning sleeves which are opposed with respect to the drive means.

22. The cleaning apparatus defined in claim 21, wherein a spacing is provided between at least one of the first plurality of cleaning sleeves and the carriage.

23. The cleaning apparatus defined in claim 22, comprising a gradient in the dimension of the spacing between the first plurality of cleaning sleeves and the carriage.

24. The cleaning apparatus defined in claim 21, wherein a spacing is provided between at least one of the second plurality of cleaning sleeves and the carriage.

25. The cleaning apparatus defined in claim 24, comprising a gradient in the dimension of the spacing between the second plurality of cleaning sleeves and the carriage.

26. The cleaning apparatus defined in claim 21, wherein a spacing is provided between at least one of the first plurality of cleaning sleeves and the carriage, and at least one of the second plurality of cleaning sleeves and the carriage.

27. The cleaning apparatus defined in claim 26, comprising a first gradient in the dimension of the spacing between the first plurality of cleaning sleeves and the carriage, and a second gradient in the dimension of the spacing between the second plurality of cleaning sleeves and the carriage.

28. The cleaning apparatus defined in claim 1, wherein the cleaning sleeve comprises a seal for sealing engagement with the portion of the exterior of the radiation source assembly, the seal removing a portion of undesired materials from the exterior of the radiation source assembly when the carriage is translated with respect to the exterior of the radiation source.

29. The cleaning apparatus defined in claim 1, wherein the cleaning sleeve comprises a substantially sealed chamber for surrounding a portion of the exterior of the radiation source assembly.

30. The cleaning apparatus defined in claim 29, wherein the cleaning sleeve further comprises an inlet for introduction of a cleaning solution to the chamber.

31. A radiation source module for use in a fluid treatment system, the module comprising:
   a frame having a first support member,
   at least one radiation source assembly extending from and in sealing engagement with the first support member, the at least one radiation source assembly comprising a radiation source;

cleaning means to remove undesired materials from an exterior of the at least one radiation source assembly, the cleaning means comprising:

a carriage movable with respect to an exterior of the radiation source assembly:

at least one cleaning sleeve in sliding engagement with the exterior of the radiation source assembly, the at least one cleaning sleeve being moveable with respect to the carriage; and drive means coupled to the carriage to translate the carriage whereby the at least one cleaning sleeve is translated over the exterior of the radiation source assembly.

32. The radiation source module defined in claim 31, the frame further comprises a second support member opposed to and laterally spaced from the first support member, the at least one radiation source assembly disposed between each of the first support member and the second support member.

33. The radiation source module defined in claim 32, the frame further comprises a third support member interconnecting the first support member and the second support member.

34. The radiation source module defined in claim 31, wherein the frame further comprises a ballast for controlling the radiation source.

35. The radiation source module defined in claim 31, wherein the first support member comprises a hollow passageway for receiving a lead wire for conveying electricity to the radiation source.

36. The radiation source module defined in claim 31, wherein the radiation source assembly comprises a protective sleeve surrounding the radiation source.

37. The radiation source module defined in claim 36, wherein the protective sleeve comprises a quartz sleeve.

38. The radiation source module defined in claim 36, wherein the protective sleeve has an open end in sealed engagement with an opening in the first support member and a closed end supported by the second support member.

39. The radiation source module defined in claim 31, wherein the at least one cleaning sleeve is rotationally moveable with respect to the carriage.

40. The radiation source module defined in claim 31, wherein the at least one cleaning sleeve is moveable with respect to the carriage in substantially the same direction as the carriage is moveable with respect to the exterior of the radiation source assembly.

41. The radiation source module defined in claim 31, wherein a spacing is provided between the at least one cleaning sleeve and the carriage.

42. The radiation source module defined in claim 31, wherein the at least one cleaning sleeve is moveable with respect to the carriage in a direction substantially orthogonal to the direction in which the carriage is moveable with respect to the exterior of the radiation source assembly.

43. The radiation source module defined in claim 31, wherein the carriage is mechanically coupled to the drive means.

44. The radiation source module defined in claim 43, wherein the drive means comprises a screw drive.

45. The radiation source module defined in claim 31, wherein the carriage is magnetically coupled to the drive means.

46. The radiation source module defined in claim 45, wherein the drive means comprises a rodless cylinder.

47. The radiation source module defined in claim 46, wherein the rodless cylinder comprises a driving member disposed in a housing, the driving member being axially slidable within the housing.

48. The radiation source module defined in claim 46, wherein the drive means is operable by a fluid pressurization source.

49. The radiation source module defined in claim 46, wherein the drive means is operable by a fluid vacuum source.

50. The radiation source module defined in claim 48, wherein the fluid pressurization source is connected to a first port which is in communication with the rodless cylinder, the first port acting alternately as a fluid inlet and fluid outlet.

51. The radiation source module defined in claim 48, wherein the fluid pressurization source is connected to a first port and a second port which are in communication with the rodless cylinder.

52. The radiation source module defined in claim 48, wherein the fluid pressurization source comprises a source of hydraulic pressure.

53. The radiation source module defined in claim 48, wherein the fluid pressurization source comprises a source of pneumatic pressure.

54. The radiation source module defined in claim 46, wherein the rodless cylinder is submersible in a fluid to be treated.

55. The radiation source module defined in claim 31, wherein the cleaning means comprises a plurality of cleaning sleeves.

56. The radiation source module defined in claim 31, wherein the cleaning means at least one pair of cleaning sleeves opposed with respect to the drive means.

57. The radiation source module defined in claim 55, wherein a spacing is provided between at least one of the cleaning sleeves and the carriage.

58. The radiation source module defined in claim 31, wherein the cleaning means comprises a first plurality of cleaning sleeves and a second plurality of cleaning sleeves which are opposed with respect to the drive means.

59. The radiation source module defined in claim 58, wherein a spacing is provided between at least one of the first plurality of cleaning sleeves and the carriage.

60. The radiation source module defined in claim 59, comprising a gradient in the dimension of the spacing between the first plurality of cleaning sleeves and the carriage.

61. The radiation source module defined in claim 58, wherein a spacing is provided between at least one of the second plurality of cleaning sleeves and the carriage.

62. The radiation source module defined in claim 61, comprising a gradient in the dimension of the spacing between the second plurality of cleaning sleeves and the carriage.

63. The radiation source module defined in claim 58, wherein a spacing is provided between at least one of the first plurality of cleaning sleeves and the carriage, and at least one of the second plurality of cleaning sleeves and the carriage.

64. The radiation source module defined in claim 63, comprising a first gradient in the dimension of the spacing between the first plurality of cleaning sleeves and the carriage, and a second gradient in the dimension of the spacing between the second plurality of cleaning sleeves and the carriage.

65. The radiation source module defined in claim 31, wherein the cleaning sleeve comprises a seal for sealing engagement with the portion of the exterior of the radiation source assembly, the seal removing a portion of undesired materials from the exterior of the radiation source assembly when the carriage is translated with respect to the exterior of the radiation source.

66. The radiation source module defined in claim 31, wherein the cleaning sleeve comprises a substantially sealed chamber for surrounding a portion of the exterior of the radiation source assembly.

67. The radiation source module defined in claim 66, wherein the cleaning sleeve further comprises an inlet for introduction of a cleaning solution to the chamber.

* * * * *